(12) United States Patent
Trautman

(10) Patent No.: US 11,814,211 B1
(45) Date of Patent: Nov. 14, 2023

(54) COIL PACKAGING LINE AND METHOD

(71) Applicant: Red Bud Industries, Inc., Red Bud, IL (US)

(72) Inventor: Jared Trautman, Ste. Genevieve, MO (US)

(73) Assignee: Red Bud Industries, Inc., Red Bud, IL (US)

( * ) Notice: Subject to any disclaimer, the term of this patent is extended or adjusted under 35 U.S.C. 154(b) by 0 days.

(21) Appl. No.: 18/116,927

(22) Filed: Mar. 3, 2023

Related U.S. Application Data

(62) Division of application No. 17/215,727, filed on Mar. 29, 2021, now Pat. No. 11,691,784.

(51) Int. Cl.
| | |
|---|---|
| *B65B 27/06* | (2006.01) |
| *B65B 35/26* | (2006.01) |
| *B65D 19/44* | (2006.01) |
| *B65B 61/28* | (2006.01) |
| *B65B 57/04* | (2006.01) |
| *B65D 85/04* | (2006.01) |
| *B65D 19/00* | (2006.01) |
| *B65B 35/24* | (2006.01) |
| *B65B 35/16* | (2006.01) |
| *B65B 57/06* | (2006.01) |

(52) U.S. Cl.
CPC .............. *B65D 19/44* (2013.01); *B65B 27/06* (2013.01); *B65B 35/16* (2013.01); *B65B 35/24* (2013.01); *B65B 35/26* (2013.01); *B65B 57/04* (2013.01); *B65B 57/06* (2013.01); *B65B 61/28* (2013.01); *B65D 19/0091* (2013.01); *B65D 85/04* (2013.01); *B65D 2519/00024* (2013.01); *B65D 2590/0058* (2013.01)

(58) Field of Classification Search
None
See application file for complete search history.

(56) References Cited

U.S. PATENT DOCUMENTS

| | | | | |
|---|---|---|---|---|
| 3,336,860 | A * | 8/1967 | Sawyer | ................... B65B 27/06 100/15 |
| 6,044,623 | A * | 4/2000 | Karaki | ................... G03B 17/26 53/118 |

FOREIGN PATENT DOCUMENTS

| | | | | |
|---|---|---|---|---|
| DE | 19533984 | A1 * | 3/1997 | ............ B21C 47/24 |
| DE | 19533984 | A1 | 3/1997 | |

* cited by examiner

*Primary Examiner* — Tanzim Imam
(74) *Attorney, Agent, or Firm* — Thompson Coburn LLP

(57) ABSTRACT

A processing line for packaging coils has a first conveyor, a sortation table, a pallet loader for placing a pallet on the sortation table, a coil discharge apparatus to move a coil from a discharge of the first conveyor to the sortation table, and a control. The control is configured to control: (i) the sortation table to move to an open position adjacent the pallet loader; (ii) the pallet loader to place a pallet at the open position of the sortation table; (iii) the sortation table to move such that the pallet occupied position is adjacent the discharge of the first conveyor; (iv) the coil discharge apparatus to move a coil from the discharge of the first conveyor on to the pallet; and (v) the sortation table to move such that the pallet occupied position is away from the discharge of the first conveyor. A similar method is provided.

10 Claims, 7 Drawing Sheets

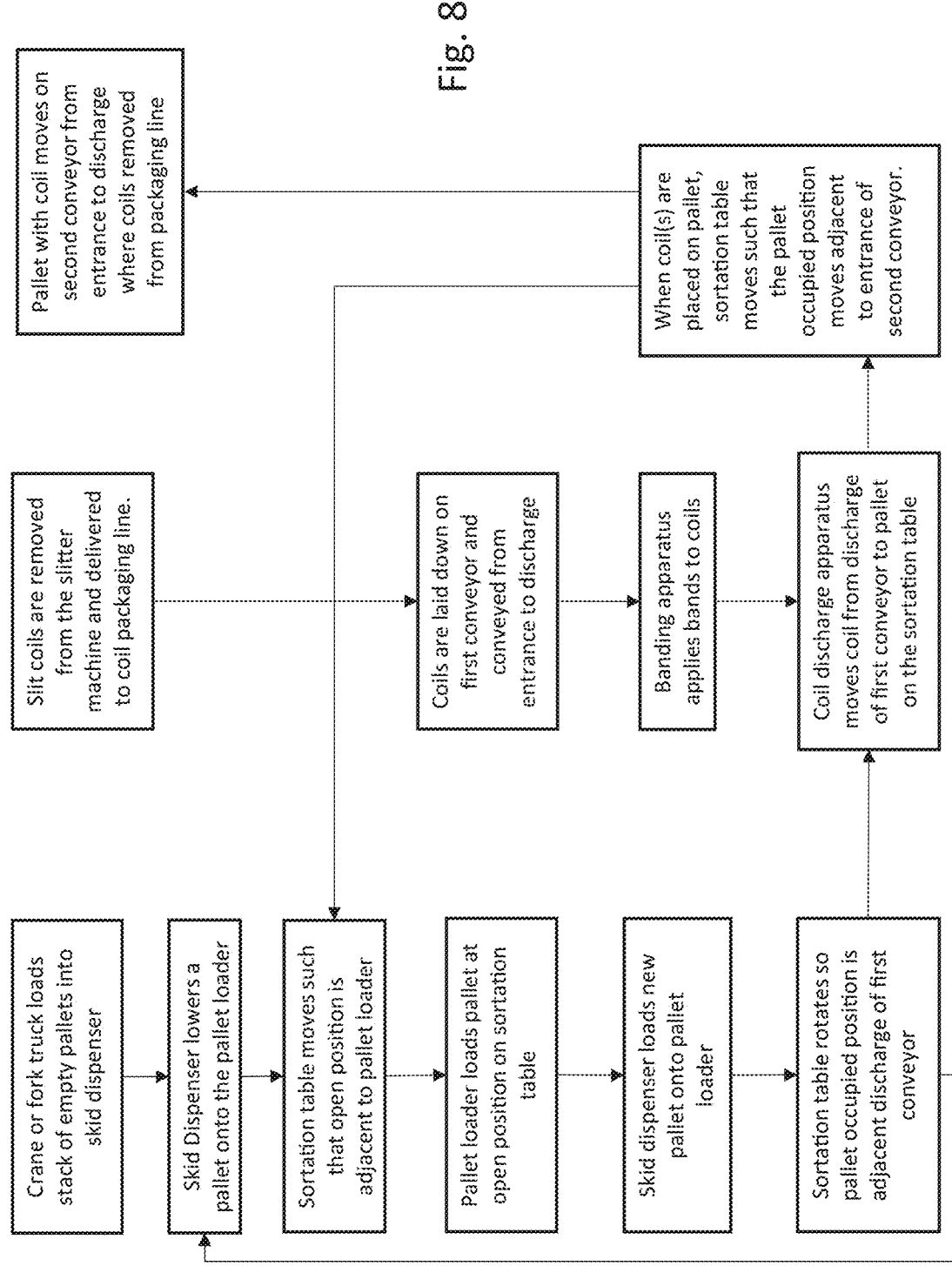

COIL PACKAGING LINE AND METHOD

RELATED APPLICATION DATA

This application is a divisional application of application Ser. No. 17/215,727, filed Mar. 29, 2021, currently pending, the disclosure of which is incorporated by reference herein.

BACKGROUND AND SUMMARY

The present disclosure is directed to a packaging line. More in particular, the present disclosure is directed to a packaging line for cylindrically wound metal coils. More in particular, the present disclosure is directed to a packaging line that is used at the end of a coil slitting operation so that slit coils from cylindrically wound metal strips can be removed from a slitting machine and packaged on the coil packaging line.

DESCRIPTION OF DRAWINGS

FIG. 8 shows a process flow diagram for the coil packaging line of FIG. 1.

DETAILED DESCRIPTION

Figure 1:
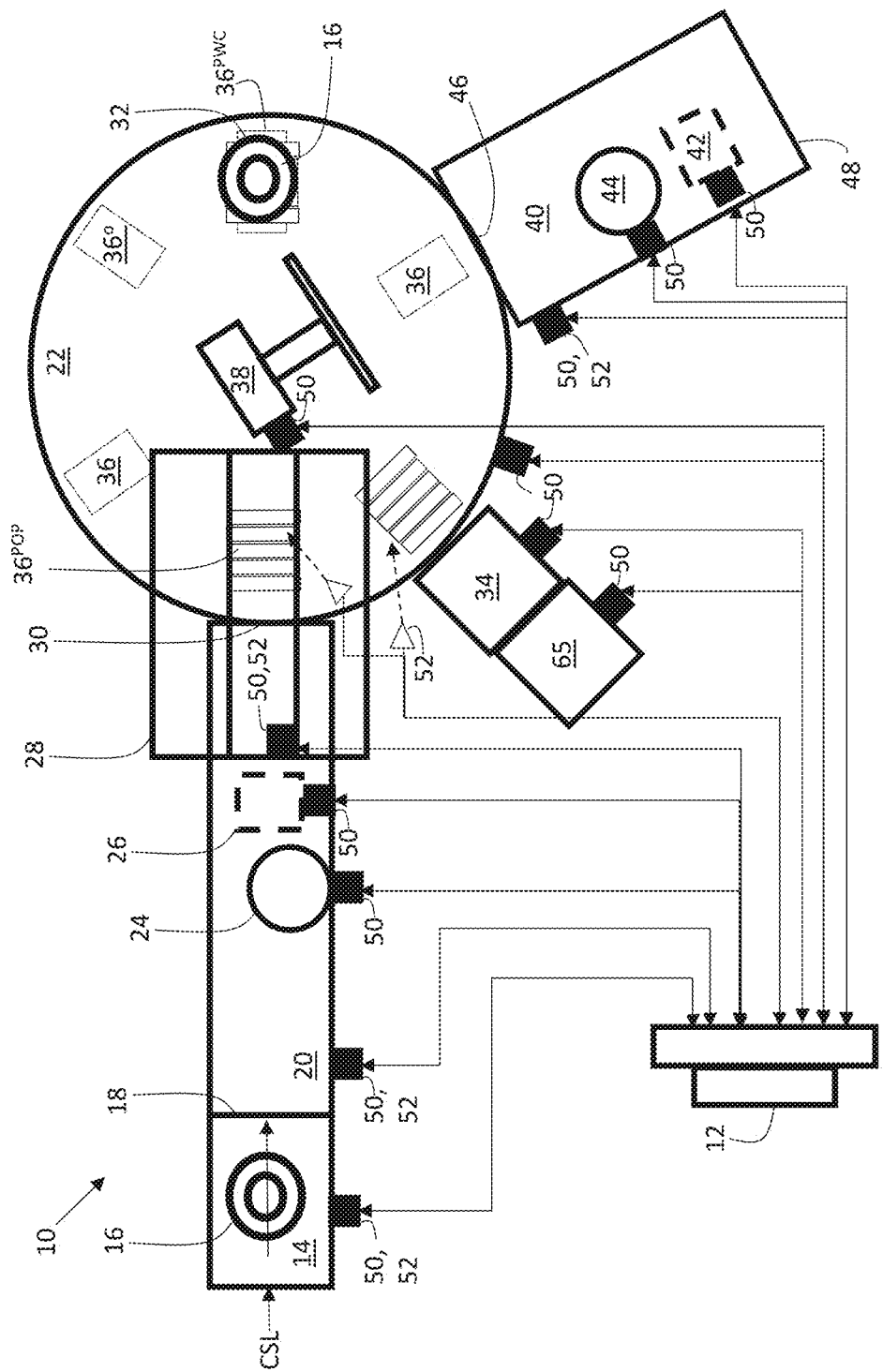
FIG. 1 is a schematic diagram of an exemplary coil packaging line.
Figure 2:
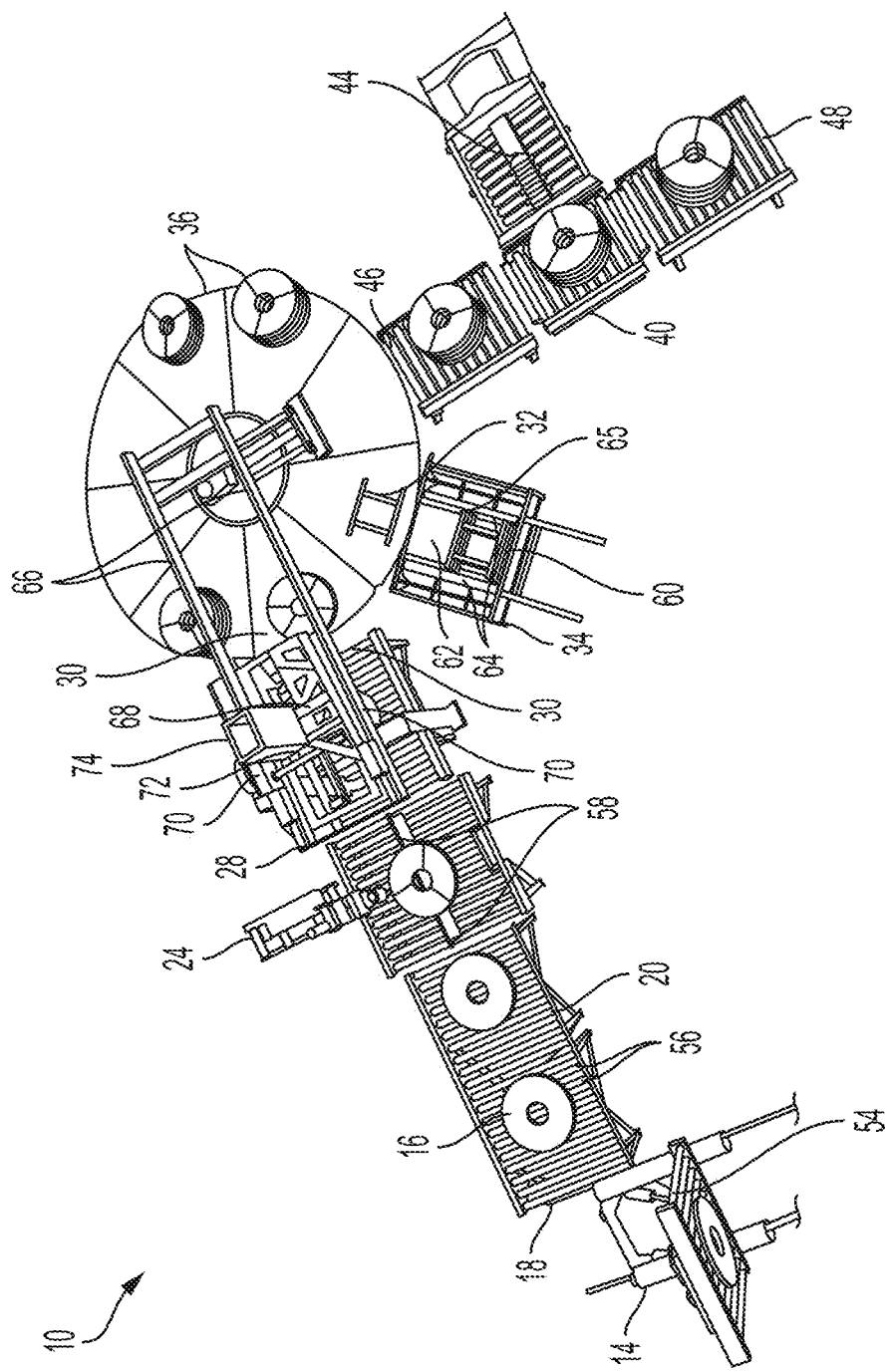
FIG. 2 is a top perspective view of the packaging line of FIG. 1.
Figure 3:
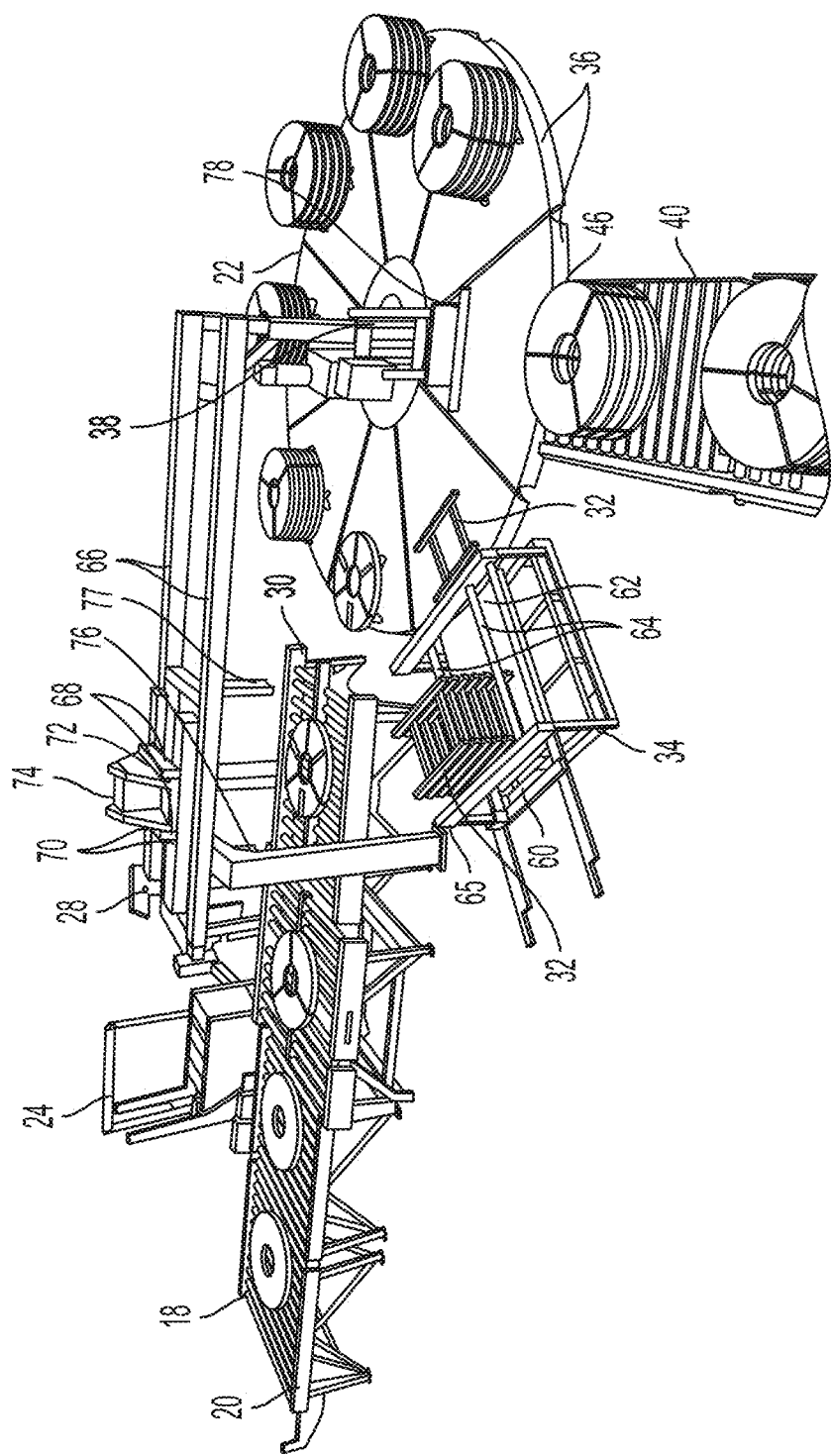
FIG. 3 is another perspective view of the coil packaging line of FIG. 1.
Figure 4:
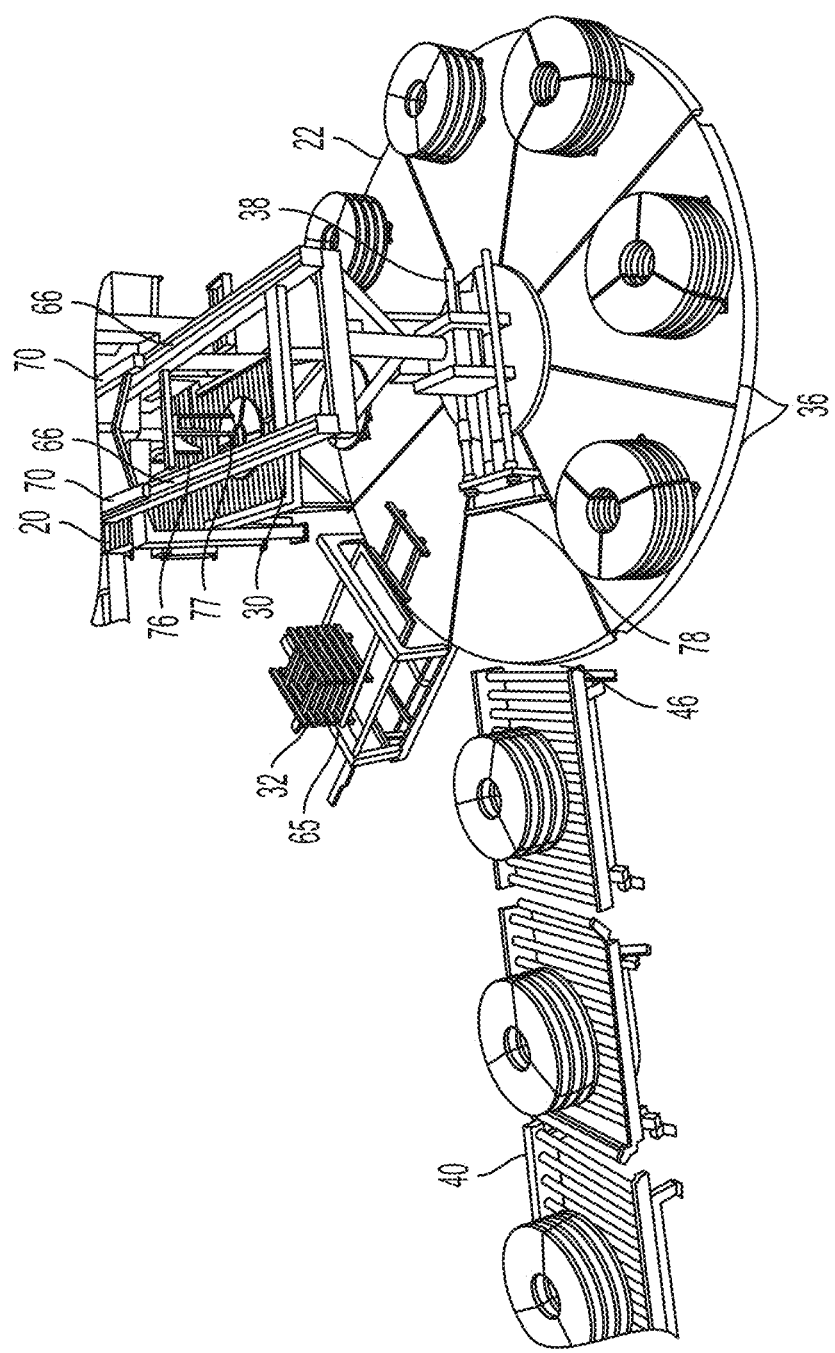
FIG. 4 is another perspective view of the coil packaging line of FIG. 1.
Figure 5:
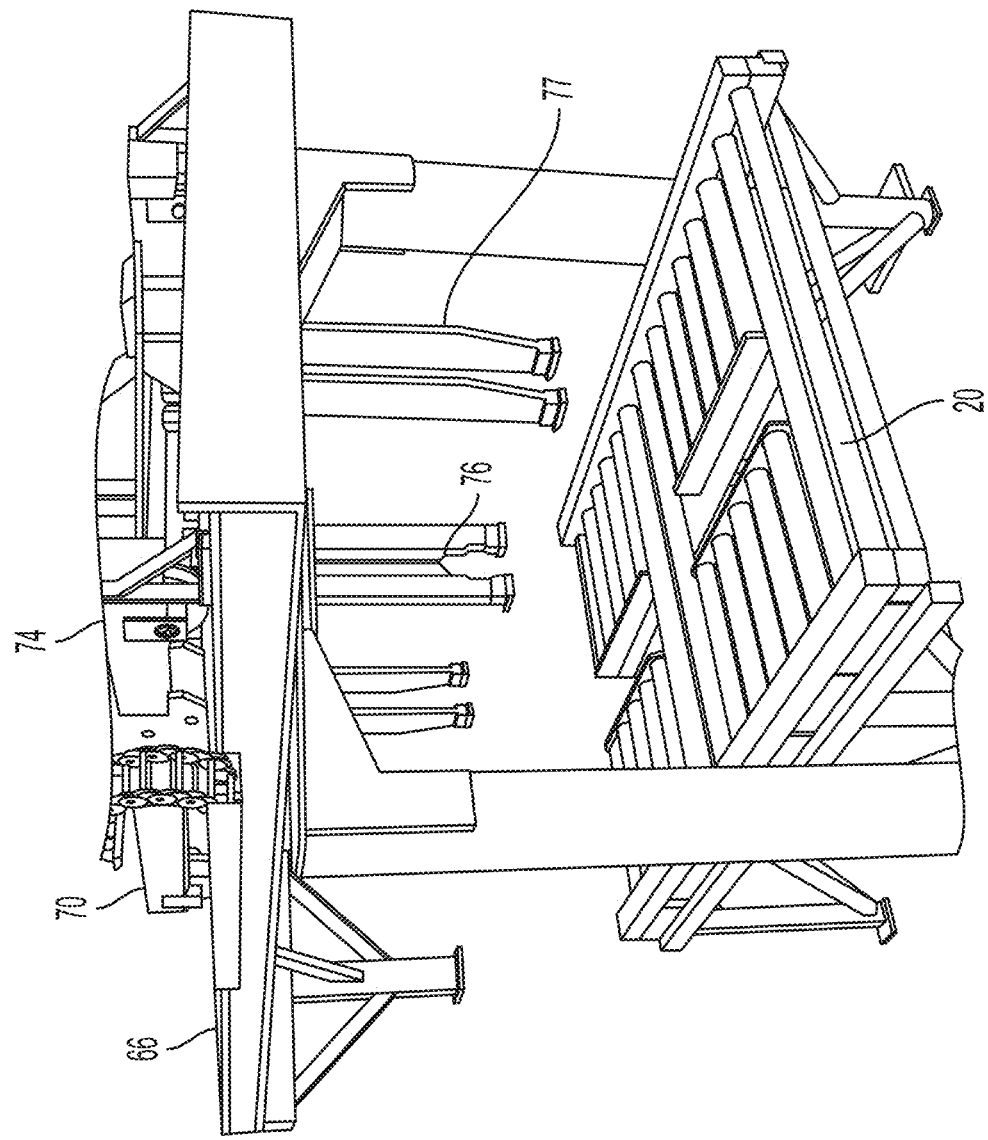
FIG. 5 is another perspective view of the coil packaging line of FIG. 1.
Figure 6:
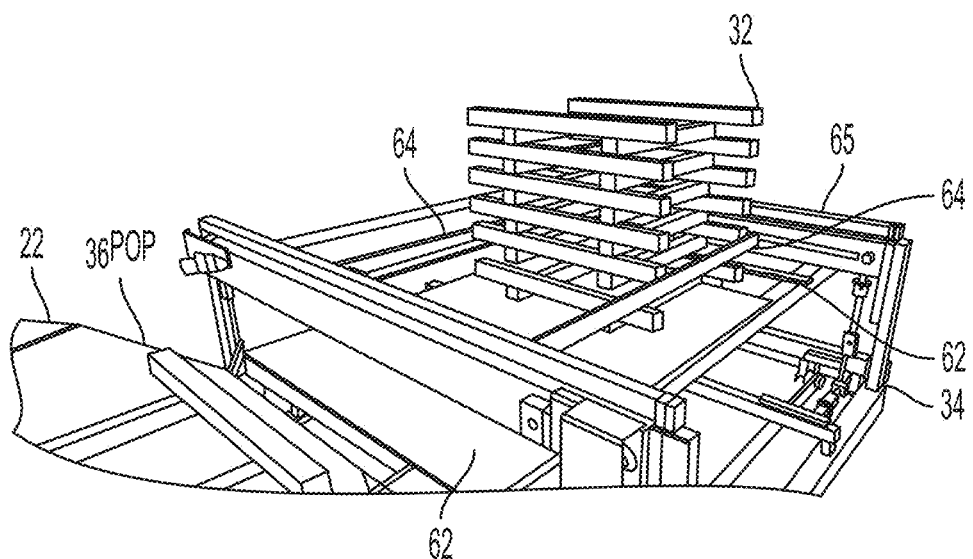
FIG. 6 is a perspective view of a pallet loader and pallet dispenser of the coil packaging line of FIG. 1.
Figure 7:
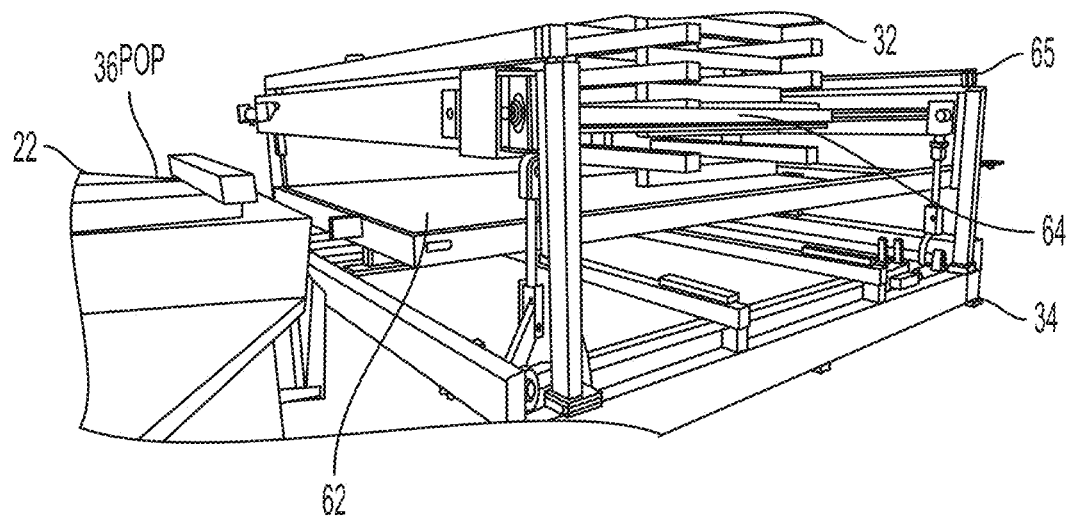
FIG. 7 is a perspective view of a pallet loader and pallet dispenser of the coil packaging line of FIG. 1.

FIG. 1 provides an overview of the coil packaging line 10 with integrated control 12 for automatic and semi-automatic operation of the coil packaging line. FIGS. 2-6 provide additional detail of the coil packaging line 10. FIG. 7 provides a process flow for at least a part of the coil packaging line 10. The coil packaging line 10 may be included in a coil slitting operation CSL. A coil slitting operation is known in the art and allows for larger cylindrically wound sheet metal coils to be slit longitudinally into narrower strips, each of which may then be cylindrically wound and directed through a coil packaging line as described herein.

The coil packaging line 10 may include a down layer 14 which removes a coil 16 from the exit turnstile of the slitting line operation CSL and directs the coil to an entrance 18 of an entry coil storage conveyor 20. The entry coil storage conveyor 20 may then transport the coil 16 to a sortation table 22. Before reaching the sortation table 22, the coil 16 may be conveyed on the entry coil storage conveyor 20, banded at a banding apparatus 24 and weighed on a scale 26, one or both of which may be integrated into the entry coil storage conveyor. A coil discharge apparatus 28, for instance, a crane or a robot, may move the coil 16 from a discharge of the entry coil storage conveyor to a pallet 32 on the sortation table 22. A pallet loader 34 may be provided adjacent the sortation table so as to allow a pallet 32 to be placed on the sortation table 22. The sortation table 22 may rotate to align the pallet 32 with the discharge 30 of the entry coil storage conveyor 20 so that the coil discharge apparatus 28 may move the coil 16 from the entry coil storage conveyor on to the pallet. The coil discharge apparatus 28 may place one or more coils on the pallet 32, depending upon the weight and size of the individual coil. The sortation table 22 may have a plurality of positions 36 to allow sorting and stacking of coils 16, thereby allowing different coil widths and weights to be sorted and stacked on the sortation table.

Once the coil(s) 16 are stacked and weighed, the pallet with the coil(s) may be removed from the sortation table 22 with a pallet unloading apparatus 38. The pallet unloading apparatus may move the pallet with the coil(s) from the sortation table 22 to a discharge coil storage conveyor 40 where the pallet with the coil(s) may be weighed on a scale 42 and removed prior to shipping. The discharge coil storage conveyor 40 may include a wrapping station 44 to protective wrap (e.g., shrink wrap, paper wrap) any pallets with coil(s) for added protection during shipping and transportation. The coil may move on the discharge coil storage conveyor from an entrance 46 to a discharge 48 of the discharge coil storage conveyor.

As shown in FIG. 1 and described in more detail below the operation of the packaging line may be integrated and automated with the controller 12 that interfaces with the various components (14,20,22,24,26,28,34,38,40,42,44) of the packaging line and sequences and/or synchronizes their operation. Each component may have one or more drive system and actuator system 50 that receive signals from the controller to actuate functionality on the component. The component may also have transmitters to transmit signals to the control regarding the status of operations of the component. Sensors 52 throughout the packaging line, which may be integrated with one or more components or external to the components) may also provide signals to the controller to enable the control to sequence/synchronize operation of the overall packaging line. The sensors 52 may be integrated with the drives of a component, for instance, an encoder, a scale. The sensors 52 may also be integrated with one or more packaging line components, for instance, proximity sensors, switches, etc. The sensors 52 may also be external to the a packaging line component, for instance, RFID, CCD, CMOS, computer vision and image processing. The sensors provide signals to the control to enable the control to control operation of the packaging line components.

The down layer 14 may be provided upstream of the entrance 18 of the entry storage conveyor 20. The down layer 14 may comprise a pivoting conveyor section 54 that is adapted and configured to remove the coil 16 from the exit turnstile of the coil slitting line CSL and place the coil on the entry coil storage conveyor. The down layer 14 may also traverse between the exit turnstile of the slitting line CSL and the entrance 18 of the entry coil storage conveyor 20. The down layer 14 may have drives and/or actuators 50 that cooperate with the control 12 to allow the control to synchronize the operation of the down layer with the other components of the packaging line. In one aspect of the control 12 and the control's interface with the down layer 14, the control may be adapted and configured to generate one or more drive and/or actuation signals to enable the pivoting conveyor section 54 of the down layer 14 to pivot from an upstanding position where the pivoting conveyor section 54 of the down layer is transverse to the entry coil storage conveyor 20 to a flat position where the pivoting conveyor section 54 of the down layer is co-planar with the entry coil storage conveyor. The control 12 may also be adapted and configured to generate one or more drive and/or actuation signals to enable the down layer 14 to translate between the exit turnstile of the coil slitting line CSL and the entrance 18 of the entry coil storage conveyor 20 while or during pivoting of the pivoting conveyor section 54 from the upstanding position to the flat position. A position and/or object detection sensor 52 may provide signals to the control 12 representative of a coil being conveyed from the down layer to the entrance of the entry storage conveyor.

The entry coil storage conveyor 20 is configured to convey the coil 16 from the entrance 18 of the entry coil storage conveyor to the discharge 30 of the entry coil storage conveyor. The entry storage conveyor 20 may include a plurality of rollers 56 spaced apart along the length of the conveyor. The center axis of rotation of each roller may be aligned in parallel with the tops of the rollers defining a plane of the entry coil storage conveyor 20 upon which the coil 16 travels. Some of the rollers may be driven and some may be idle. The control 12 may be adapted and configured to generate signals that cooperate with drive system 50 of the entry coil storage conveyor 20 to enable the entry coil storage conveyor to move a coil 16 from the entrance 18 of the entry coil storage conveyor to the discharge 30 of the entry coil storage conveyor. The entry coil storage conveyor 20 may include the scale 26 for weighing the coil. In one aspect, the control 12 may be adapted and configured to receive a position signal that a coil is adjacent the scale 26. The control 12 may activate the scale 26 to measure the weight of the coil. The scale 26 may transmit signals representative of the weight of the coil 16 to the control 12. The entry coil storage conveyor 20 may also include a banding apparatus 24 integrated in the conveyor upstream of the discharge 30 of the entry coil storage conveyor. In one aspect, the control 12 may be adapted and configured to receive a position signal that a coil 16 is adjacent the banding apparatus 24 on the entry coil storage conveyor, and generate a signal to enable the banding apparatus to install a band on the coil. The banding apparatus 24 may be configured to wrap a band radially around the coil. The entry coil storage conveyer 20 may have a plurality of drive rollers 58 adjacent the banding apparatus 24 that may be sequenced in operation by the control 12 to allow the coil 16 to rotate and reorient relative to the entry coil storage conveyor 20 and the banding apparatus 24 to allow the banding apparatus to install a further band on the coil when the coil is reoriented. Position signals may be provided to control 12 indicating the coil has been sufficiently reoriented, and actuation signals may be provided to the banding apparatus 24 to install a band on the coil.

The sortation table 22 is provided at the discharge 30 of the entry coil storage conveyor 20. The sortation table 22 may have a plurality of positions 36 which may be empty or open ('$36^O$'), occupied with an empty pallet ('$36^{POP}$'), or occupied with a pallet with one or more coils ('$36^{PWC}$'). The sortation table 22 may be indexable in motion and may be otherwise adapted and configured to rotate in a manner to place any position of the plurality of positions 36 of the sortation table adjacent to the discharge 30 of the entry coil storage conveyor, as well as adjacent to the pallet loader 34 and the entrance 60 to the discharge coil storage conveyor 40. The sortation may have a drive 50 that receives control signals from the control 12. The drive 50 may control rotation and speed of the sortation table. The motion may be uni-directional or bi-directional rotation motion. Position sensors 52 may be provided to sense the positions 36 of the sortation table 22 and object detection sensors may be provided to sense the capacity and backlog of the sortation table.

In one aspect of the control 12 and the control's interface with the sortation table 22, the control may be adapted and configured to: (i) receive an object detection signal representative of an open position $36^O$ of the sortation table; (ii) generate a drive or actuation signal to enable the sortation table 22 to move the open position $36^O$ of the sortation table adjacent the pallet loader 34; and (iii) receive a position sensor signal that the open position $36^O$ of the sortation table is moved adjacent the pallet loader.

In another aspect of the control 12 and the control's interface with the sortation table 22, the control may be adapted and configured to: (i) receive an object detection signal representative of a pallet occupied position $36^{POP}$ of the sortation table; (ii) generate a drive or actuation signal to enable the sortation table 22 to move the pallet occupied position $36^{POP}$ of the sortation table 12 adjacent the discharge 30 of the entry coil storage conveyor 20; and (iii) receive a position sensor signal that the pallet occupied position $36^{POP}$ of the sortation table is moved adjacent the discharge 30 of the entry coil storage conveyor 20.

In another aspect of the control 12 and the control's interface with the sortation table 22, the control may be adapted and configured to: (i) receive an object detection signal representative of a coil on the pallet of the pallet occupied position $36^{POP}$ of the sortation table; and (ii) generate a drive or actuation signal to enable the sortation table 22 to move the pallet occupied position $36^{POP}$ of the sortation table away from discharge 30 of the entry coil storage conveyor 20.

In another aspect of the control 12 and the control's interface of the sortation table 22, the control may be adapted and configured to: (i) generate a drive or actuation signal to move the sortation table such that the pallet occupied position with coil $36^{PWC}$ of the sortation table (i.e., the position having a pallet with one or more coils) is adjacent to the entrance 46 of the discharge coil storage conveyor 40; (ii) receive a position sensor signal that the pallet occupied position with coil $36^{PWC}$ is adjacent the entrance 46 the discharge coil storage conveyor 40; and (iii) generate a drive or actuation signal to move the sortation table such that the newly open position $36^O$ (previously occupied by the pallet with the coil) is away from the entrance 46 of the discharge coil storage conveyor 40 once the pallet with the coil(s) is on or at the entrance 46 of the discharge coil storage conveyor 40.

The pallet loader 34 is provided adjacent the sortation table 22. The pallet loader may be adapted and configured to place a pallet 32 on the sortation table 22 at an open position $36^O$ of the sortation table. The pallet loader 34 may have a pusher 60 that sweeps across a platform 62 and injects a pallet 32 onto the sortation table 22. The pallet loader 34 may have a pallet dispenser 65 disposed above the pallet loader. The pallet dispenser may be adapted and configured to load a new pallet 32 in the pallet loader 34 after the pallet is placed at the open position 36 of the sortation table 22. The pallet dispenser 65 may have side-by-side rails 64 that form a magazine to align and store pallets 32 and move as needed to allow a pallet to move from the lowest position in the magazine to the platform. The pallet loader 34 and/or pallet dispenser 65 may have drives and actuators 50 that receive control signals from the control 12. The pallet loader 34 and/or pallet dispenser 65 may also transit signals to the control 12 indicating the status of certain operations of the pallet loader and/or pallet dispenser.

In one aspect of the control and control's interface with the pallet loader 34 and/or pallet dispenser 65, the control 12 may be adapted and configured to: (i) receive a position sensor signal that the open position $36^O$ of the sortation table 22 is moved adjacent the pallet loader 34; (ii) generate an actuation signal to the pallet loader 34 to enable the pallet loader to place a pallet in the open position $36^O$ of the sortation table 22; and (iii) receive an object detection signal that the pallet 32 occupies the open position of the sortation table. The control 12 may also be configured to generate an actuation signal for the pallet dispenser 65 to enable the pallet dispenser to load a new pallet 32 in the pallet loader 34 after the control receives the signal that the pallet is at the open position of the sortation table. The pallet dispenser 65 may operate or may also be controlled with signals directly from the pallet loader 34 as an integrated unit with the pallet dispenser or may interface directly with the control 12.

The coil discharge apparatus 28 may be adapted and configured to move a coil 16 from the discharge 30 of the first conveyor to the sortation table 22. The coil discharge apparatus 28 may be a crane extending between the entry coil storage conveyor 20 and the sortation table 22. The coil discharge apparatus 28 may also comprise a robot. As shown in the drawings, the crane may be an overhead crane. The overhead crane may include spaced apart overhead runways 66 with one or more bridge girders 68 extending from one overhead runway to the opposite overhead runway. An end truck 70 may be provided at the ends of the bridge girders 68 to allow the bridge girders to move along the runways 66. The bridge girders 68 may be provided with runway rails 72, and a trolley hoist apparatus 74 may be adapted and configured to move along the runway rails. In one aspect of the crane, the runways 66 may be aligned parallel with the entry storage conveyor, and the runway rails 72 may be arranged transverse to the runways 66. The end trucks 70 may provide positioning of the trolley hoist apparatus on the runways 66 in a direction along the length of the entry coil storage conveyor 20 (i.e., parallel to the entry coil storage conveyor 20 and the direction of conveyance of a coil on the entry coil storage conveyor). The trolley hoist apparatus 74 may move along the runway rails 72 so as to position the trolley hoist apparatus in a direction along the width of the entry coil storage conveyor 20 (i.e., transverse to the entry coil storage conveyer and the direction of conveyance of a coil on the entry coil storage conveyor). The trolley hoist apparatus 74 may include depending arms 76,77 which may be radially moveable between an engagement position where the arms engage the inner and outer diameter surfaces and bottom surface of the coil for lifting and moving the coil, and a disengagement position where the arms are spaced from the inner and outer diameter surfaces and bottom surface of the coil for releasing from the inner and outer diameter surfaces and bottom surface of the coil when placing the coil on the pallet or before engaging a coil. Thus, in one aspect, the crane 28 may be adapted and configured to move the coil 16 from the discharge 30 of the entry coil storage conveyor 20 to the sortation table 22 in a direction parallel with a direction of advancement of the coil from the entrance of the first conveyor to the discharge of the first conveyor. The coil discharge apparatus 28 may have a drive and actuators 50 that receive and transmit signals to and from the control 12. The coil discharge apparatus 28 may also have one or more sensors 52 that provide signals to the control 12 for integrating the operation of the coil discharge apparatus with the entry storage conveyor 20 and the sortation table 22.

In one aspect of the control 12 and the control's interface with the coil discharge apparatus 28 (e.g., the crane), the control may be adapted and configured to: (i) receive an object detection signal that the pallet occupied position $36^{POP}$ of the sortation table 22 is adjacent the discharge 30 of the entry coil storage conveyor 20; (ii) generate a drive signal to enable the trolly hoist apparatus 74 of the crane 28 to move to a position relative to the discharge 30 of the entry coil storage conveyor where the arms 76,77 once in the engagement position are enabled to engage the inner and outer diameter surfaces and bottom surface of the coil; (iii) generate an actuation signal to enable the crane to lower the arms 76 of the crane, (iv) generate an actuation signal to enable the crane to actuate the arms 76,77 to the engagement position to engage the inner and outer diameter surfaces and bottom surface of the coil, (v) generate an actuation signal to enable the crane to raise the arms 76,77 of the crane, (vi) generate a drive signal to enable the trolly hoist apparatus 74 of the crane 28 to move to a position relative to the pallet occupied position 36 of the sortation table 22 where the arms 76,77 once lowered and in the disengagement position are enabled to disengage from the inner and outer diameter surfaces and bottom surface of the coil, (vii) generate an actuation signal to enable the crane to lower the arms 76,77 of the crane, (viii) generate an actuation signal to enable the crane to actuate the arms 76,77 to the disengagement position to disengage the inner and outer diameter surfaces and bottom surface of the coil and release the coil 16 onto the pallet 32 (or a spacer on the top of another coil); (ix) receive an object detection signal that the coil 16 is on the pallet 32 (or a spacer on the top of another coil); and (x) generate a drive signal to move the sortation table 22 such that the pallet occupied position with coil $36^{PWC}$ is away from the discharge 30 of the entry coil storage conveyor 20.

The pallet unloading apparatus 38 may be integrated with the sortation table 22 as shown or may be a stand-alone machine (i.e., a robot). The pallet unloading apparatus 38 may comprise a pallet pusher 78 adapted and configured to engage a radially inward portion of the pallet 32 with the coil and move the pallet with the coil radially outward off the sortation table 22 to the entrance 80 of the discharge coil storage conveyor 40. The pallet unloader 38 may have drives and actuators 50 that receive control signals from the control 12 and may also transit signals to the control indicating the status of certain operations of the pallet unloader.

In one aspect of the control 12 and control's interface with the pallet unloader 38, the control may be adapted and configured to: (i) receive a position sensor signal that the pallet occupied position with coil $36^{PWC}$ of the sortation table 22 is moved adjacent the pallet unloader and/or the entrance 46 to the discharge coil storage conveyor 40; (ii) generate an actuation signal to the pallet unloader 38 to enable the pallet unloader to move the pallet with the coil(s) from the pallet occupied position with coil $36^{PWC}$ of the sortation table onto the entrance 46 of the discharge coil storage conveyor 40; and (iii) receive an object detection signal that the pallet no longer occupies the pallet occupied position of the sortation table and/or is positioned in the entrance of the discharge storage conveyor.

In the processing line, the discharge coil storage conveyor 40 is configured to convey the coil 16 from the entrance 46 of the discharge coil storage conveyor 40 to the discharge 46 of the discharge coil storage conveyor. The discharge coil storage conveyor 40 may include a plurality of rollers spaced apart along the length of the conveyor. The center axis of rotation of each roller may be aligned in parallel with the tops of the rollers defining a plane of the discharge coil storage conveyor 40 upon which the pallet with the coil(s) travels. Some of the rollers may be driven and some may be idle. The control 12 may be adapted and configured to generate a signal that cooperates with drive system 50 of the discharge coil storage conveyor to enable the discharge coil storage conveyor to move the coil 16 from the entrance 46 of the discharge coil storage conveyor to the discharge 48 of the discharge coil storage conveyor. The discharge coil storage conveyor 40 may include a scale 42 for weighing the coil. In one aspect, the control 12 may be adapted and configured to receive a position signal that a coil is adjacent the scale 42. The control 12 may activate the scale to measure the weight of the coil. The scale 42 may transmit signals representative of the weight of the pallet with coil(s) to the control 12. The discharge coil storage conveyor 40 may also have sensors 52 that interface with the control to allow the control 12 to synchronize the operation of the discharge coil storage conveyor with other packaging line components. For instance, the discharge coil storage conveyor may generate an object detection signal that the pallet with the coil is at the entrance 46 of the discharge coil storage conveyor 40 and/or is on the discharge coil storage conveyor. Upon receipt of the signal, the control 12 may be adapted and configured to generate a signal to move the new open position 36$^O$ (previously the pallet occupied position) of the sortation table 22 away from the entrance 46 of the discharge coil storage conveyor 40. The discharge coil storage conveyor 40 may also include a wrapping apparatus 44 disposed or integrated in the conveyor downstream of the entrance of the discharge coil storage conveyor. The control 12 may be adapted and configured to receive a signal that a coil 16 is adjacent the wrapping apparatus 44 on the discharge coil storage conveyor, and generate a signal to enable the wrapping apparatus to wrap a wrapping on the coil. The discharge coil storage conveyer 40 may have a plurality of drive rollers adjacent the wrapping apparatus 44 that may be sequenced in operation to allow the coil 16 to rotate and reorient relative to the discharge coil storage conveyor and the wrapping apparatus to allow the wrapping apparatus to wrap the coil with a protective wrap as the coil is being reoriented.

The embodiments were chosen and described in order to best explain the principles of the disclosure and their practical application to thereby enable others skilled in the art to best utilize the disclosed embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above escribed exemplary embodiments, but should be defined only in accordance with the following claims appended hereto and their equivalents.

What is claimed is:

1. A processing line for packaging coils of cylindrically wound strips of metal, the processing line comprising:
    a first conveyor adapted and configured to convey a coil from an entrance of the first conveyor to a discharge of the first conveyor;
    a sortation table having a plurality of positions, the sortation table being adapted and configured to rotate in a manner to place any position of the plurality of positions of the sortation table adjacent to the discharge of the first conveyor;
    a pallet loader, the pallet loader being adapted and configured to place a pallet on the sortation table;
    a coil discharge apparatus adapted and configured to move the coil from the discharge of the first conveyor to the sortation table; and
    a control for the processing line, the control being adapted and configured to: (i) receive a signal representative of an open position of the sortation table; (ii) generate a signal to enable the sortation table to move the open position of the sortation table adjacent to the pallet loader; (iii) receive a signal that the open position of the sortation table is moved adjacent to the pallet loader; (iv) generate a signal to enable the pallet loader to place a pallet in the open position of the sortation table to occupy the open position of the sortation table; (v) receive a signal that the pallet occupies the open position of the sortation table; (vi) generate a signal to enable the sortation table to move such that the position occupied by the pallet is adjacent to the discharge of the first conveyor; (vii) receive a signal that the position occupied by the is adjacent to the discharge of the first conveyor; (viii) generate a signal to enable the coil discharge apparatus to move the coil from the discharge of the first conveyor onto the pallet; (ix) receive a signal that the coil is on the pallet; and (x) generate a signal to move the sortation table such that the position occupied by the pallet is away from the discharge of the first conveyor.

2. The processing line of claim 1 wherein the coil discharge apparatus comprises a crane extending between the first conveyor and the sortation table.

3. The processing line of claim 2 wherein the crane is adapted and configured to move the coil from the discharge of the first conveyor to the sortation table in a direction parallel to a direction of advancement of the coil from the entrance of the first conveyor to the discharge of the first conveyor.

4. The processing line of claim 1 further comprising:
    a second conveyor adapted and configured to convey the pallet with the coil from an entrance of the second conveyor to a discharge of the second conveyor; and
    a pallet unloading apparatus, the pallet unloading apparatus being adapted and configured to move the pallet with the coil from the sortation table to the entrance of the second conveyor;
    wherein the sortation table is adapted and configured to place any position of the plurality of positions of the sortation table adjacent to the entrance of the second conveyor; and
    wherein the control is adapted and configured to: (xi) generate a signal to move the sortation table such that the position occupied by the pallet is adjacent to the entrance of the second conveyor; (xii) receive a signal that the position occupied by the pallet is adjacent to the entrance of the second conveyor; (xiii) generate a signal to enable the pallet unloading apparatus to move the pallet with the coil from the sortation table to the second conveyor to form a new open position of the sortation table; (xiv) receive a signal that the pallet with the coil is on the second conveyor and the new open position is on the sortation table; and (xv) generate a signal to move the new open position of the sortation table away from the entrance of the second conveyor.

5. The processing line of claim 4 wherein the pallet unloading apparatus comprises a pallet pusher, the pallet pusher is adapted and configured to engage a radially inward portion of the pallet with the coil and move the pallet with the coil radially outward off the sortation table to the entrance of the second conveyor when the control generates the signal to enable the pallet unloading apparatus to move the pallet with the coil from the sortation table to the entrance of the second conveyor.

6. The processing line of claim 1 further comprising a banding apparatus disposed in the first conveyor upstream of the discharge of the first conveyor;
   wherein the control is adapted and configured to: (a) receive a signal that the coil is adjacent to the banding apparatus; and (b) generate a signal to enable the banding apparatus to install a band on the coil.

7. The processing line of claim 6 wherein the first conveyor has a plurality of driven rollers adapted and configured to reorient the coil on the first conveyor while the coil is adjacent to the banding apparatus;
   wherein the control is adapted and configured to: (c) generate a signal to enable the driven rollers to reorient the coil on the first conveyor; and (d) generate a signal to enable the banding apparatus to install a further band on the coil when the coil is reoriented.

8. The processing line of claim 1 further comprising a pivoting conveyor section upstream of the entrance of the first conveyor;
   wherein the control is adapted and configured to generate a signal to enable the pivoting conveyor section to pivot between a flat position in which the pivoting conveyor section is co-planar with the first conveyor and an upstanding position in which the pivoting conveyor section is transverse to the first conveyor.

9. The processing line of claim 1 wherein the pallet loader includes a pallet dispenser, and the control is adapted and configured to generate a signal to enable the pallet dispenser to load a new pallet in the pallet loader after the control receives the signal that the pallet occupies the open position of the sortation table.

10. The processing line of claim 1 wherein the control is adapted and configured to generate a signal to enable the first conveyor to move the coil from the entrance of the first conveyor to the discharge of the first conveyor.

\* \* \* \* \*